Nov. 27, 1951 R. W. ELBOURN ET AL 2,576,676

FREQUENCY DIVISION FOR TELEVISION SYSTEMS

Filed Dec. 7, 1948 2 SHEETS—SHEET 1

INVENTORS
ROLAND W. ELBOURN
LEONARD R. J. JOHNSON
BY Paul Kolisch
ATTORNEY

INVENTORS
ROLAND W. ELBOURN
LEONARD R. J. JOHNSON
BY Paul Kolisch
ATTORNEY

Patented Nov. 27, 1951 2,576,676

UNITED STATES PATENT OFFICE 2,576,676

FREQUENCY DIVISION FOR TELEVISION SYSTEMS

Roland William Elbourn, Southall, and Leonard Reginald Joffre Johnson, Hayes, England, assignors to Cinema-Television Limited, London, England, a corporation of England Application December 7, 1948, Serial No. 63,862
In Great Britain July 4, 1947

2 Claims. (Cl. 250—36)

Figure 1:
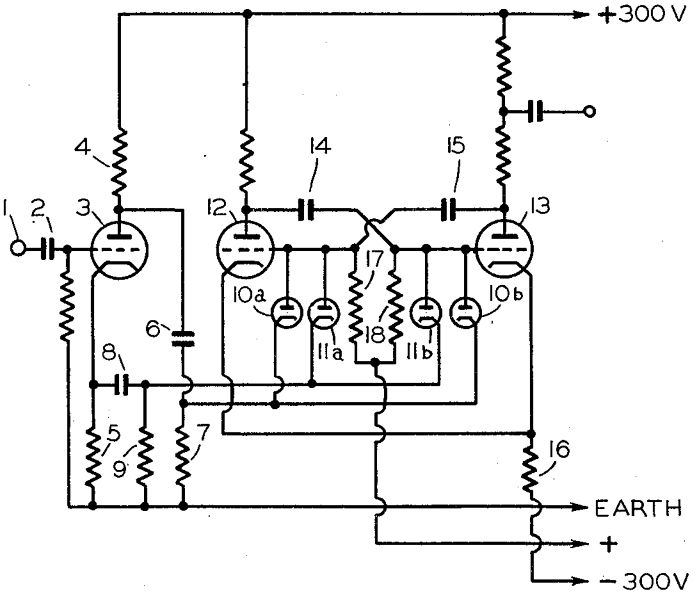

This invention relates to methods of frequency division and is especially concerned with a new and improved method suitable for use in television and like systems.

In a normal television system of known type the scanning process employed comprises completing the scanning of a frame in an odd number of lines and in an even number (two) of fields, the fractional line in each field being employed to effect the interlacing of the two sets of lines forming the complete frame.

The normal practice in deriving synchronizing signals for a system of the kind described is to employ a master oscillator operating at a frequency which is equal to the number of lines scanned per second multiplied by the number of fields scanned to complete the scanning of a frame. Thus in a 405-line, double interlaced system with a field repetition rate of 50 per second, the master oscillator would have a frequency of 20,250 cycles per second. The master oscillator frequency is then divided by two to obtain the line synchronizing frequency and, in a separate dividing chain, is divided by factors of 5, 9 and 9 in succession to obtain the field synchronizing frequency. This somewhat elaborate process has been adopted owing to the apparent necessity for employing a common multiple of the field and line frequencies as the master oscillator frequency so that each of these frequencies may be derived therefrom by division by integral numbers.

This known system has, however, several disadvantages, for example, the provision of a frequency dividing stage for deriving the line frequency from the master oscillator frequency is obviously wasteful of valves and, in systems in which large numbers of scanning lines are employed, the frequency of the master oscillator becomes inconveniently high, as it enters a region in which the design of stable oscillators becomes difficult.

The present invention seeks to overcome these disadvantages by avoiding the necessity for employing a master oscillator operating at a multiple of the line frequency and to allow that this oscillator shall operate at the actual line frequency.

According to one aspect of the present invention there is provided a method of frequency division by a number of the form $(2n+1)/2m$ (where $n$ and $m$ are integers) which comprises generating two sets of voltage pulses, the pulses in each set being recurrent at the frequency to be divided and the pulses of one set being displaced in phase substantially by 180° with respect to the pulses of the other set, and applying both sets of pulses to control by their combined effect a circuit adapted to produce signals having a frequency which is an integral submultiple of the effective frequency of said combined pulses.

According to a feature of this aspect of the present invention there is provided a method of frequency division by a number of the form $(2n+1)/2m$ (where $n$ and $m$ are integers) which comprises generating two sets of voltage pulses, the pulses in each set being recurrent at the frequency to be divided and the pulses of one set being displaced in phase substantially by 180° with respect to the pulses of the other set, and applying both sets of pulses independently to the grids of each of a pair of thermionic valves connected in a multivibrator circuit having parameters such that the said circuit tends to complete a cycle of operation in a time which is a desired non-integral submultiple of the period of one cycle of the frequency to be divided, so that pulses of each set alternately operate to produce successive changes in the existing condition in said circuit.

According to a further feature of this aspect of the invention, the said sets of pulses are derived by generating at the frequency to be divided a square-wave potential containing substantially no even harmonics, applying said square wave potential to a phase-splitting circuit of known type having two substantially equal but oppositely phased outputs, differentiating each of said outputs and selecting pulses of like polarity from each of said differentiated outputs to form said sets of pulses.

According to an alternative aspect of the present invention there is provided a method of generating synchronizing signals in a television or like system which comprises generating a signal at the frequency of one set of synchronizing signals, applying said signal in part to circuits adapted to perform thereon a process of frequency division including a division by a non-integral number of the form $(2n+1)/2m$ (where $n$ and $m$ are integers) and employing the frequency-divided signal to control the generation of synchronizing pulses of a lower frequency.

Figure 2:
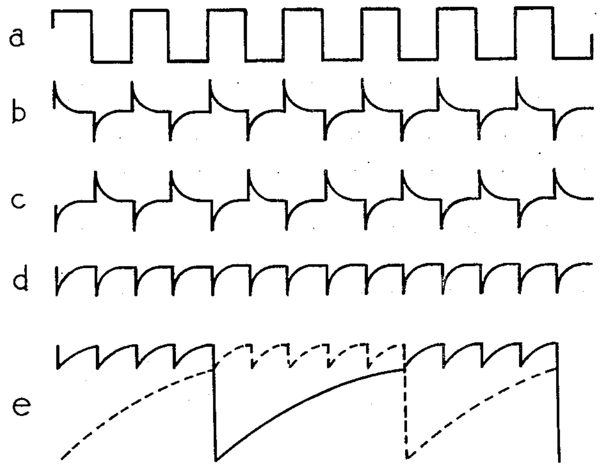
Figure 3:
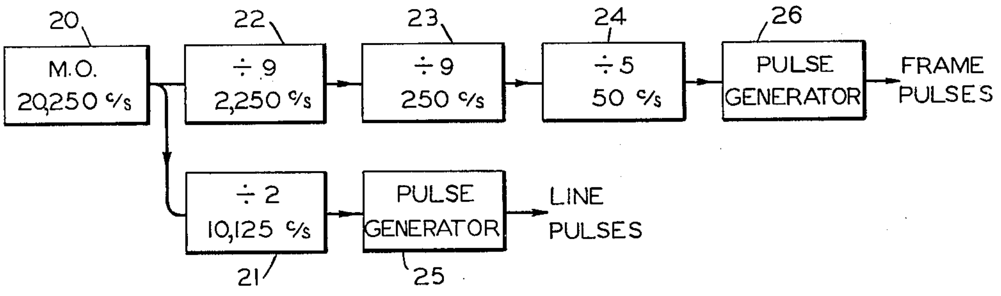
Figure 4:
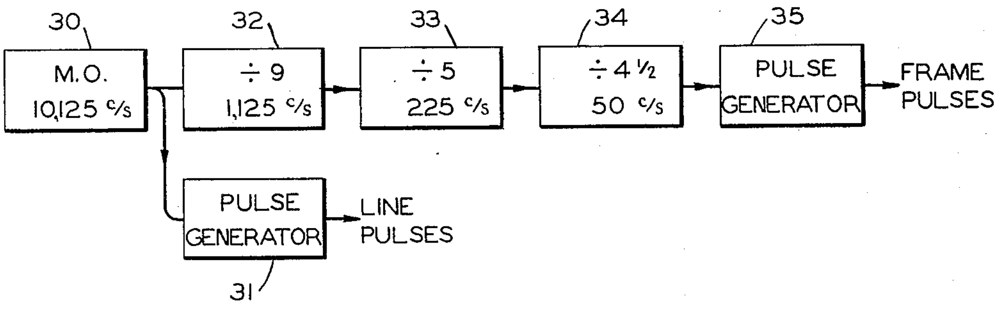
Figure 5:
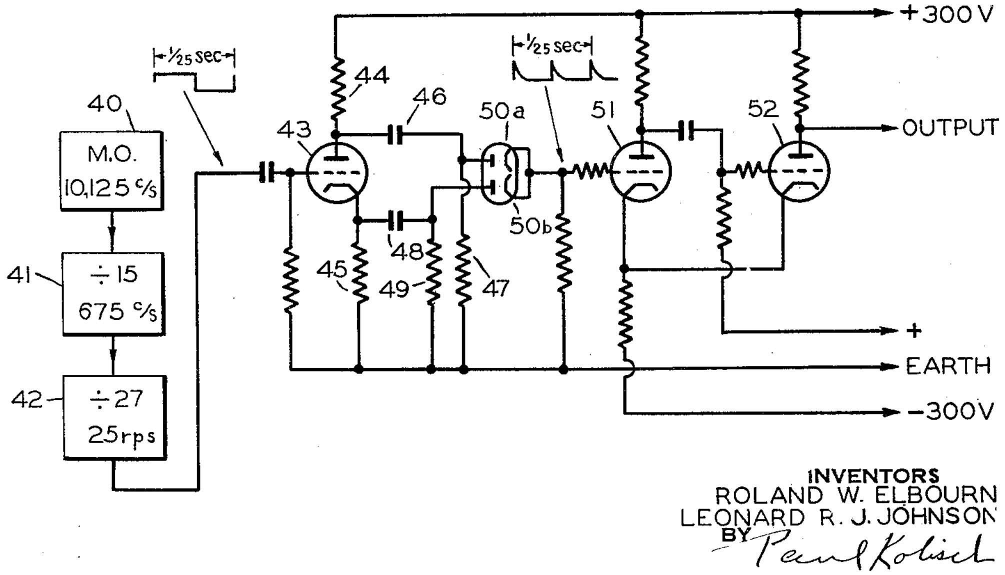

In order that the present invention may be more readily understood, reference is now made to the drawings comprising Figures 1 to 5, of which:

Figure 1 is a circuit diagram illustrating one embodiment of the first aspect of the present invention, Figure 2 shows a series of waveforms illustrating the operation of the circuit of Figure 1, Figure 3 is a block diagram illustrating a known system of deriving synchronizing signals in a television system, and Figure 4 is a block diagram illustrating a system of deriving synchronizing signals in accordance with the present invention, Figure 5 is a diagram illustrating an alternative embodiment of the first aspect of the invention.

Referring to Figure 1, this diagram illustrates a circuit for carrying out a process of division by a factor of 4½. Its operation will be described with reference to the wave forms shown in Figure 2.

A square-wave voltage pulse as shown at *a* in Figure 2 is applied to the terminal 1 and thence through condenser 2 to the grid of valve 3. This valve is arranged to operate as a phase-splitting valve, having equal anode and cathode load resistances 4, 5. Signals appearing across each of these resistances are differentiated by the condenser and resistance combinations 6, 7 and 8, 9 respectively to yield voltage pulses of the form shown in *b* and *c* of Figure 2. Both sets of pulses are applied to the cathodes of separate diode valves 10*a*, 10*b*, 11*a*, 11*b* (these being contained in pairs in two envelopes) which have their anodes connected to the grids of valves 12, 13. Assuming that the valves 12, 13 were inoperative, the potential produced on the grid of each would thus be of the form shown at *d* in Figure 2, the positive-going pulses being unable to pass through the diodes 10, 11.

The valves 12, 13 are, however, connected so as to operate as a multivibrator of known type, their anodes and grids being mutually cross-connected by way of condensers 14, 15 and their cathodes returned to a negative source of potential through a common cathode resistance 16. The grids of the valves are returned through resistances 17, 18 to a source of positive potential, the value of which may be varied in accordance with the frequency applied to the dividing circuit.

The time constants of the coupling components 14, 18 and 15, 17 are so chosen that the whole circuit tends to complete a cycle of operation in 4½ cycles of the square-wave potential applied to terminal 1 and are proportioned so that while valve 12 passes from the inoperative to the operative condition in five half-cycles of the applied square wave, valve 13 performs this operation in four half-cycles, as illustrated in *e* of Figure 2.

Thus, pulses derived across part of the anode load of valve 13 will recur at a frequency 1/4½ of the frequency of the square-wave applied to terminal 1.

The invention is not, of course, limited to the use of the particular form of multi-vibrator shown in Figure 1, as it may be carried into effect in other embodiments.

Referring now to Figure 5, which illustrates one such alternative embodiment of this aspect of the invention, a master oscillation generator 40 generates signals at a frequency of 10,125 c./s. These signals are applied to a frequency dividing circuit 41, which divides by a factor of 15, giving output signals at a frequency of 675 c./s. These again are divided in circuit 42 by a factor of 27 to give an output signal at a frequency of 25 c./s. The signal derived from the circuit 42 is arranged to be of square-wave form and to contain substantially no even harmonics. This signal is applied to the grid of a phase-splitting valve 43, having equal anode and cathode load resistances 44, 45, signals developed across which are partially differentiated by the resistance-condenser combination 46, 47 and 48, 49 and are then applied to the anodes of diode valves 50*a*, 50*b* which for convenience are contained in a common envelope. The cathodes of the two diodes are connected to the grid of valve 51 which together with valve 52 forms a pulse-generating circuit of known type. As the two sets of signals applied to the grid of valve 51 are both repetitive at a frequency of 25 c./s. and are displaced in phase by 180°, the effective frequency of signals applied to valve 51 is 50 c./s. so that the signals derived from the pulse-generating circuit comprising valves 51, 52 also have a repetition rate of 50 p. p. s. Thus the signal applied to the circuit 42 has been effectively divided by a factor of 13½ to give this output signal.

Figure 3 is a block diagram illustrating a known method of deriving synchronizing signals for a 405-line, 50-fields/per second television system. A master oscillator 20 operates at twice the line frequency, i. e. at 20,250 cycles per second. The output from this oscillator is applied to two frequency dividing circuits 21 and 22, the first of which divides by a factor of two to give the line frequency of 10,125 cycles per second, while the other divides by a factor of nine to give a frequency of 2,250 cycles per second, which is applied to another frequency dividing stage 23. This stage divides by a further factor of nine to give a frequency of 250 cycles per second which is in turn applied to a fourth frequency dividing circuit 24 which divides by a factor of five to give the frame frequency of 50 cycles per second. The signals from the circuits 21 and 24 are applied to pulse generating circuits 25 and 26 which generate the actual synchronizing signals.

Figure 4, on the other hand, illustrates a method of deriving synchronizing signals for the same system but by the use of the present invention. The master oscillator 30 operates at a frequency of 10,125 cycles per second and its output is in part applied to control the pulse generator 31 which produces the line synchronizing signals and in part to the frequency dividing circuit 32 which divides by a factor of nine to give an output signal at 1,125 cycles per second. This signal is in turn applied to the circuit 33 which divides by a factor of five to give an output signal at 225 cycles per second and this is finally divided in the circuit 34, which may be of the type illustrated in Figure 1, by a factor of 4½ to give the field frequency of 50 cycles per second. This arrangement yields the advantages of a lower master oscillator frequency which does not require division before use to generate the line synchronizing pulses and that, as the amount of frequency division to be performed is reduced by a factor of two, the accuracy with which the field synchronizing pulses can be locked to the line pulses is increased.

The invention is not limited to the specific embodiments illustrated and it is possible to use it in many other arrangements, for example, it may be used in a system in which frequency division is effected in two stages of division by factors of 15 and 13½ respectively, though even higher factors may be used with satisfactory results.

What is claimed is:

1. A method of frequency division by a number of the form $(2n+1)/2m$ (where $n$ and $m$ are integers) which comprises generating two sets of voltage pulses, the pulses in each set being recurrent at the frequency to be divided and the pulses of one set being displaced in phase substantially by 180° with respect to the pulses of the other set, and applying both sets of pulses to control by their combined effect a circuit adapted to produce signals having a frequency which is an integral submultiple of the effective frequency of said combined pulses, said sets of pulses being derived by generating at the frequency to be divided a square-wave potential containing substantially no even harmonics, applying said square-wave potential to a phase-splitting circuit of known type have two substantially equal but oppositely phased outputs, differentiating each of said outputs and selecting pulses of like polarity from each of said differentiated outputs to form said sets of pulses.

2. A method of frequency division by a number of the form $(2n+1)/2m$ (where $n$ and $m$ are integers) which comprises generating two sets of voltage pulses, the pulses in each set being recurrent at the frequency to be divided and the pulses of one set being displaced in phase substantially by 180° with respect to the pulses of the other set, and applying both sets of pulses independently to a circuit adapted to complete a cycle of operation in a time which is a desired non-integral submultiple of the period of one cycle of the frequency to be divided, so that pulses of each set alternately operate to produce successive changes in the existing condition in said circuit, said sets of pulses being derived by generating at the frequency to be divided a square-wave potential containing substantially no even harmonics, applying said square wave potential to a phase-splitting circuit of known type having two substantially equal but oppositely phased outputs, differentiating each of said outputs and selecting pulses of like polarity from each of said differentiated outputs to form said sets of pulses.

ROLAND WILLIAM ELBOURN.
LEONARD REGINALD JOFFRE JOHNSON.

REFERENCES CITED

The following references are of record in the file of this patent:

UNITED STATES PATENTS

| Number | Name | Date |
|---|---|---|
| 2,022,969 | Meacham | Dec. 3, 1935 |
| 2,478,683 | Bliss | Aug. 9, 1949 |

OTHER REFERENCES

Andrew: "The Adjustment of the Multivibrator for Frequency Division," Pro. I. R. E., vol. 19, No. 11, November 1931, pages 1911–17.